United States Patent [19]

Kinard

[11] Patent Number: 5,018,453
[45] Date of Patent: May 28, 1991

[54] AUXILIARY RAILROAD WHEEL LIFT ASSEMBLY FOR ROAD VEHICLE

[75] Inventor: Daniel P. Kinard, Snellville, Ga.

[73] Assignee: Bankhead Enterprises, Inc., Atlanta, Ga.

[21] Appl. No.: 444,848

[22] Filed: Dec. 4, 1989

[51] Int. Cl.⁵ .............................................. B61D 15/00
[52] U.S. Cl. .................................................. 105/72.2
[58] Field of Search .................. 105/72.2, 215.2, 215.1

[56] References Cited

U.S. PATENT DOCUMENTS

| | | | |
|---|---|---|---|
| 3,356,042 | 12/1967 | Herscovitch | 105/72.2 |
| 3,898,938 | 8/1975 | Poole | 105/72.2 |
| 3,980,025 | 9/1976 | Olson | 105/72.2 |
| 4,488,494 | 12/1984 | Powell | 105/215.2 |
| 4,534,297 | 8/1985 | Johnson, Sr. | 105/72.2 |

FOREIGN PATENT DOCUMENTS

0335553  8/1919  Fed. Rep. of Germany ... 105/215.2

Primary Examiner—Robert J. Oberleitner
Assistant Examiner—Mark T. Le
Attorney, Agent, or Firm—Thomas, Kerr & Kayden

[57] ABSTRACT

A conversion apparatus (10) for converting a vehicle (V) for travel on a railway comprises first and second assemblies (20, 20') connected by an axle (23). Each assembly (20, 20') comprises a first support member (11) rigidly mounted to the vehicle frame and a second support member (13) pivotally mounted to the vehicle frame. The second support member is coupled to the first support member for limiting the pivotal movement of the second support member relative to the vehicle frame. A pair of railway wheel support arms (18, 18') are pivotally mounted to the second support member (13) for movement between raised and lowered positions and carry a railway wheel (21) rotatably mounted thereon. A hydraulic cylinder (22) moves the railway wheel support arms between the raised and lowered positions. An extendable and retractable tongue (37) is provided for coupling and decoupling the assembly to the vehicle suspension while providing a slidable supporting engagement with the vehicle suspension when the tongue is coupled to the vehicle suspension. The tongue is moved by a linkage (42) connected to the railway wheel support arms so that as the railway wheel support arms are moved between the raised and lowered positions the tongue is moved between the retracted and extended positions.

25 Claims, 4 Drawing Sheets

AUXILIARY RAILROAD WHEEL LIFT ASSEMBLY FOR ROAD VEHICLE

TECHNICAL FIELD

This invention relates to a road and railway vehicle, and more particularly to an auxiliary railroad wheel assembly mounted to a road vehicle, which can be retracted when the vehicle is traveling on a flat road surface or distended downwardly into engagement with the tracks of a railroad for supporting and guiding the vehicle along the tracks, thereby converting the road vehicle to a railroad vehicle.

BACKGROUND OF THE INVENTION

In many instances the best or only way to move a vehicle to a particular destination is via a railway track. This may be because the railway offers a smoother surface than paved roads, or because the railroad track is the only available cleared surface that reaches a particular destination. In addition, railway maintenance vehicles are often expected or required to travel on both roads and railway tracks, and require means for converting from one travel surface to the other. Most surface vehicles designed for use on paved roads and for use off-road are not suitable for use on a railway. As the railway is made up of two parallel steel tracks supported by spaced cross ties, and the typical lateral distance between the wheels of most surface vehicles is different than the spacing of the parallel railroad tracks, the road wheels cannot stably ride upon the railway but instead usually have to ride over the spaced apart cross ties, which places enormous demands on the vehicle suspension.

It is known in the art to provide an apparatus for converting road vehicles for railway travel. Examples of such vehicles are disclosed in U.S. Pat. Nos. 4,077,328; 804,025 and 3,730,105. Such a conversion apparatus typically includes railway wheels movably mounted to the frame of the vehicle for movement between a raised, retracted position for road travel and a lowered, distended position for rail travel. A drawback to this arrangement has been the lack of suitable suspension means interposed between the vehicle frame and the railway tracks, resulting in a harsh ride. Also, when the railroad wheels support the vehicle, the road wheels tend to extend downwardly toward the track which sometimes causes the road wheels to engage other objects and interfere with the movements of the vehicle on the railroad tracks.

This problem has been addressed in the art by mounting the conversion apparatus at one point to the vehicle suspension and at another point the vehicle frame to transmit some of the load of the vehicle through the vehicle's own suspension to provide some cushioning of the ride along the railway. For example, U.S. Pat. No. 4,488,494 teaches a conversion apparatus in which a support arm is pivotally attached at one of its ends to the vehicle frame and is pivotally attached at its opposite end to the vehicle suspension. A railway wheel support plate carries a railway wheel and is pivotally mounted to the support arm.

While arrangements of this general type provide a more cushioned ride through the use of the vehicle road wheel suspension to partially support the railroad wheels, it does so at the expense of decreased service life of various components of both the vehicle road wheel suspension and the conversion apparatus. This is so because the arcuate path of travel of the end of the pivoted support arm which is attached at one end to the vehicle suspension and pivots at its other end about the vehicle frame does not match the designed path of travel of the suspension apparatus of the vehicle road wheels. Therefore, as the vehicle suspension moves up and down, and as the support arm of the conversion apparatus pivots, longitudinal stresses are placed on some components of the vehicle suspension as well as on some components of the conversion apparatus, which ultimately damage or shorten the life thereof. These unwanted stresses result both when the vehicle is driven over the road and when the vehicle is driven on the railway because the conversion apparatus is permanently attached to the vehicle road wheel suspension, regardless of the use of the vehicle.

Accordingly, it is seen that a need yet remains for an apparatus for converting road vehicles for railway travel which utilizes the suspension of the vehicle road wheels to provide a cushioned ride to the railroad wheels without damaging the suspension or diminishing the service life thereof. It is the provision of such an improved vehicle and the conversion apparatus therefore that the present invention is primarily directed.

SUMMARY OF THE INVENTION

Briefly described the present invention comprises a convertible road and railway vehicle. More particularly the invention comprises an apparatus for converting a self propelled, wheeled road vehicle to a vehicle for travel on a railway, the vehicle having a frame and a suspension, with railroad wheels retractable to a raised position out of engagement with the railroad tracks and distendable to a lowered position which guide and support the vehicle on railroad tracks. A converting apparatus is mounted adjacent the front road wheel assemblies of the vehicle and the converting apparatus includes a pair of assemblies each having a main support arm oriented parallel to the normal direction of movement of the vehicle and pivotally mounted at a first end portion thereof to the vehicle frame. A railway wheel support arm is pivotally mounted at a first end portion thereof to the main support arm for pivoting movements between raised and lowered positions. A railway wheel is rotatably mounted to the other end of the railway wheel support arm remote from the pivoted end portion of the railway wheel support arm. Means are provided for moving the railway wheel support arm between the raised and lowered positions and for securing the railway wheel support arm in the raised and lowered positions. Further means are provided for temporarily supporting the vehicle road wheel suspension with the main support arm in response to the railway wheel support arm being moved to its lowered position.

Preferably, the means for temporarily supporting the vehicle suspension comprises a movable suspension engagement member which can be moved between a retracted position and an extended position in which the movable suspension engagement member is positioned slidably beneath the vehicle road wheel suspension so as to support the vehicle road wheel suspension and to allow the vehicle road wheel suspension and the movable suspension engagement member to travel through differing paths of movement.

Therefore, it is an object of this invention to provide an improved convertible road and railway vehicle which utilizes the road wheels suspension system to cushion the ride for the railroad wheels.

It is another object of the present invention to provide a road wheel and railroad wheel conversion apparatus which utilizes the road wheel suspension for the railroad wheels substantially without interfering with the path of travel of the road wheel suspension.

It is yet another object of the present invention to provide a conversion apparatus for self propelled vehicles which supports the vehicle road wheel suspension when the apparatus is to be used to convert the vehicle for use on a railway and which is readily decoupled from the vehicle road wheel suspension when the vehicle is not being used on a railway.

It is yet another object of the present invention to provide a conversion apparatus for self propelled vehicles which makes use of the vehicle road wheel suspension for cushioning the ride on a railway and yet which does not significantly diminish the durability of the vehicle suspension.

Other objects, features and advantages of the present invention will become more apparent upon reading the following specification in conjunction with the drawings.

DETAILED DESCRIPTION

Figure 4A:
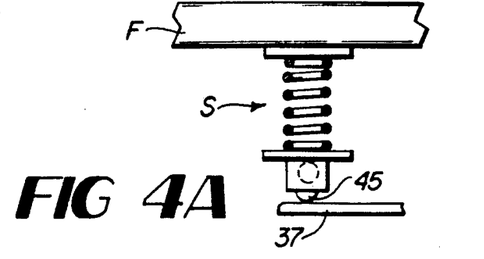
FIGS. 4A and 4B are schematic illustrations of a portion of the conversion apparatus of FIG. 1A shown coupled to representative vehicle suspensions.
Figure 4B:
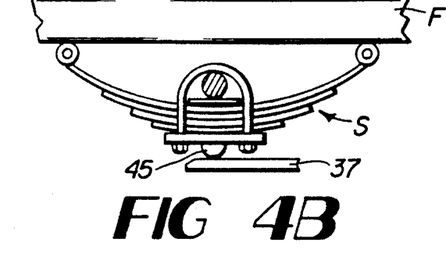
Figure 5:
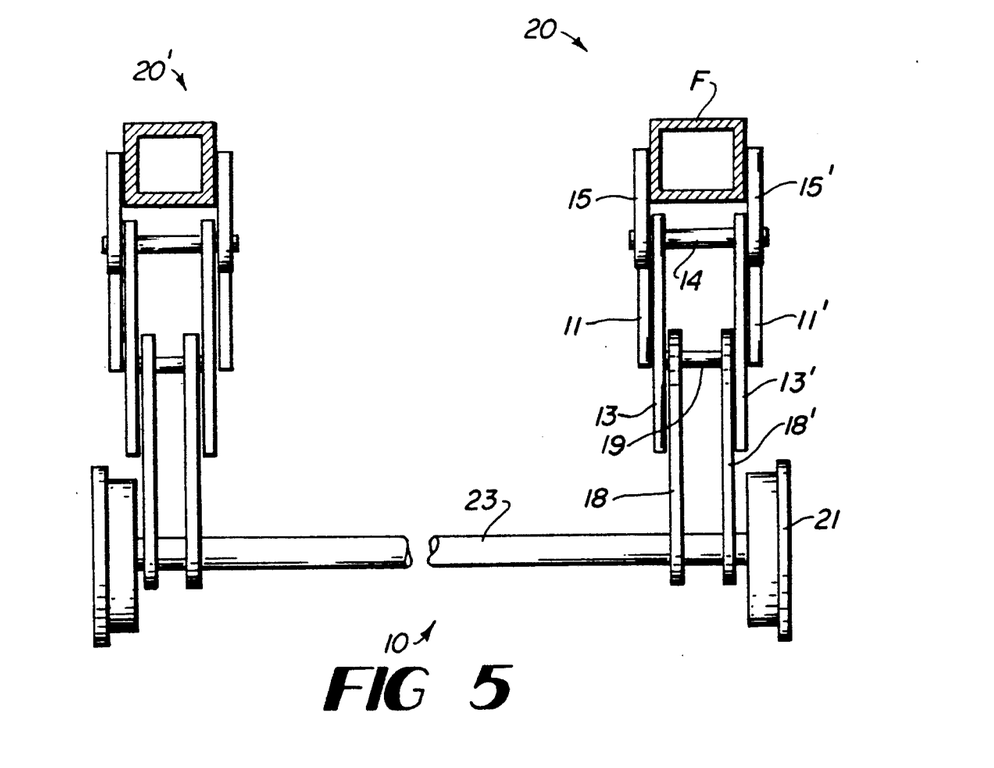
FIG. 5 is a front view of the conversion apparatus of FIG. 1 with some elements omitted for clarity of illustration.

Turning now in more detail to the drawings figures, in which like reference numerals represent like parts through out the several views, FIGS. 1-5 show a conversion apparatus 10 according to the present invention in a preferred form. It is to be understood in this discussion that much of the conversion apparatus 10 comprises substantially duplicate pairs of parts, with the duplicate part denoted by a prime (') mark next to its reference numeral. The conversion apparatus 10 comprises a first assembly 20, and, as best seen in FIG. 5, a second assembly 20' which is substantially a mirror image of assembly 20. The assemblies 20, 20' are linked by a common rigid axle 23 extending between them. FIGS. 1-3 and 5 show assembly 20 mounted to a vehicle frame F and comprising rigid support arms 11, 11' depending from frame F and secured rigidly thereto by unshown fasteners or weldments. An elongated slot 12 is formed through a portion of support arm 11 distal from frame F. A similar unshown slot is formed in support arm 11' in a corresponding position.

A second pair of rigid support arms 13, 13' are each pivotally coupled at one end thereof to the frame F by means of a pivot pin 14 extending between the support arms 13, 13' and through pivot support plates 15, 15'. The pivot support plates are rigidly secured to the vehicle frame F by unshown bolts or weldments and are spaced from the support arm 11. Pivoting support arms 13, 13' are generally wedge-shaped and extend from the pivot pin 14 beyond the depending support arms 11, 11'.

A support pin 17 extends through the pivoting support arms 13, 13' distal from the pivot pin 14 and is received within slots 12 formed in the rigid support arms 11, 11'. The support pin 17 is securely retained within the pivoting support arms 13, 13' and movably received within the slots 12. The slots 12 are slightly arcuate and are perpendicular to an axis drawn between the slots 12 and the pivot pin 14. In this manner, the slots 12 and the support pin 17 support the pivoting support arms 13, 13' and allow them to pivot through an arc of limited dimension.

A pair of railway wheel support arms 18, 18' are pivotally mounted to a pivot pin 19 mounted in a lower portion of pivoting support arms 13, 13' and generally intermediate of support pin 17 and pivot pin 14. Preferably the pivot pin 19 is closer to the suspension than to a vertical axis 16 extending through pin 14. The railway wheel support arms 18, 18' carry a railway wheel 21 rotatably mounted to an axle 23 mounted to the wheel support arms 18, 18'. The railway wheel support arms are adapted for movement between a lowered position shown in FIGS. 1A and 1B and a raised position shown in FIG. 2B. A hydraulic cylinder 22 is pivotally mounted at one end thereof between and to the pivoting support arms 13, 13' and the opposite end of hydraulic cylinder 22 is pivotally mounted to the railway wheel support arms intermediate of pivot pin 19 and railway wheel axle 23.

A pair of stops 24 are rigidly mounted between the pivoting support arms 13, 13' for engaging an upper surface 26 of each railway wheel support arm with the railway wheel support arm in the lowered position. Each stop acts as a positive means of preventing the railway wheel support arm from rotating past the generally vertical orientation of the lowered position.

As illustrated in 1A-2B, an L-shaped safety lock pin 27 is secured to pivoting support arm 13 by means of a flexible link chain 28. An aperture 29 is formed through railway wheel support arms 18 and 18' spaced from an axis extending between pivot pin 19 and axle 23. A first pair of aligned apertures 30 are formed in pivoting support arms 13, 13' and a second pair of aligned apertures 31 are formed in the pivoting support arms as well. The apertures 30 are positioned so that with the railway wheel support arms in the lowered position, the lock pin 27 may be inserted through the aperture 30 in the pivoting support arm 13, through the railway wheel support arm apertures 29 and then through the corresponding aperture in the pivoting support arm 13'. In this manner the railway wheel support arms may be positively locked in the lowered position. Likewise, apertures 31 may be used in a similar fashion for securing the railway wheel support arms in a raised position.

A coupling and decoupling mechanism 36 comprises a means for temporarily supporting the vehicle suspension with the pivoting support arms and is mounted in an end of the pivoting support arms 13, 13' distal from the pivot pin 14. The coupling/decoupling meechanism, as best seen in FIGS. 1B, 2A, 2B and FIG. 3, comprises a broad, flat elongated tongue 37 having a smooth upper surface and slidably received within a hollow box section 38 which is secured between the pivoting support arms 13, 13'. Tongue 37 includes a beveled portion 39 and raised tabs 40. Raised tabs 40 extend through an opening 41 in an upper portion of the rectangular box section 38. The tabs 40 are connected to the railway wheel support arms 18, 18' by means of a linkage 42 which is rotatably mounted to the tabs 40 and rotatably mounted to the railway wheel support arm by means of a pin 34. An access hole 33 is provided in each support arm 13, 13' for allowing the pin 34 to be driven in or out of the linkage 42, as for service or assembly. A half round bar 45 with a smooth outer surface is rigidly secured beneath a lower portion of the vehicle's suspension indicated generally by S. FIGS. 4A and 4B show the half round bar 45 mounted beneath typical vehicle suspension systems, with FIG. 4A representing a coil spring suspension and FIG. 4B representing a leaf spring suspension.

Pivoting support arms 13, 13' are braced to each other to form a rigid structure by means of additional pins, bolts or plates extending between the pivoting support arms. If desired, a plate may be welded between the pivoting support arms 13, 13' at the upper edges thereof to seal the upper portion of the pivoting support arms from weather.

Figure 6:
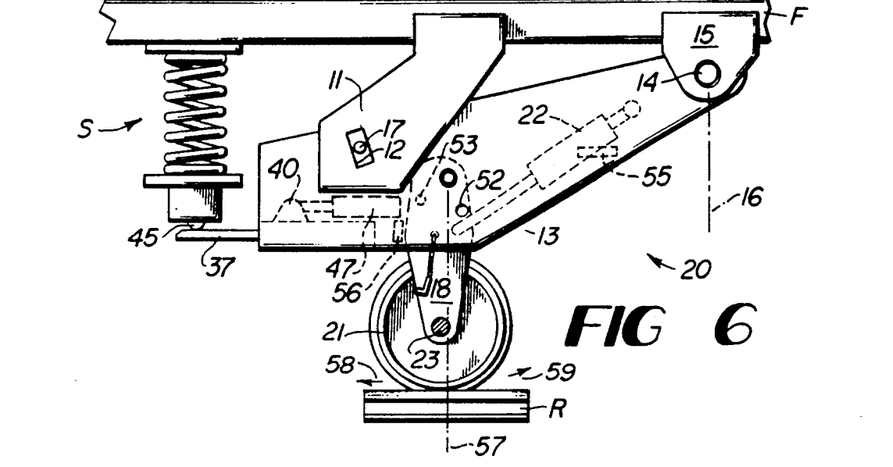
FIG. 6 is a side view of a conversion apparatus according to the present invention in a second preferred form.
Figure 7:
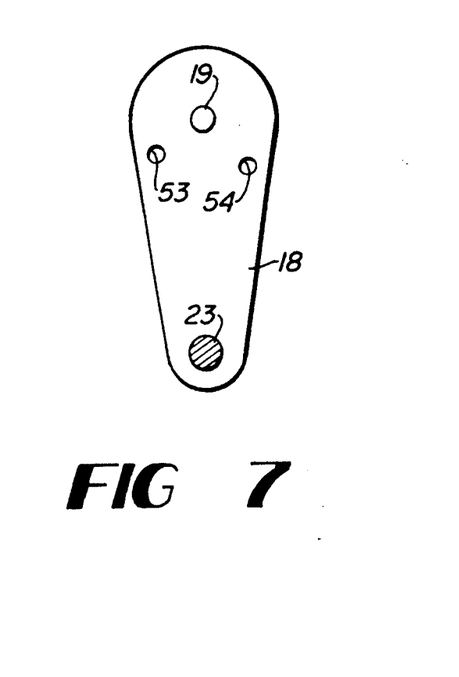
FIG. 7 is a side view of a portion of the conversion apparatus of FIG. 6.

FIGS. 6 and 7 shows the conversion apparatus comprising assembly 20 according to the present invention in a second preferred form in which the linkage 42 is replaced with a hydraulic cylinder 47 for actuating the tongue 37 through the raised tabs 40. Furthermore, FIGS. 6 and 7 show a modified railway wheel support arm 18 having a rounded top portion to provide additional clearance as the railway wheel support arm pivots about pin 19. Accordingly, stops 24, 24' are replaced with lower stops 56, 56' and upper stops 55, 55' each mounted to pivoting support arms 13, 13'. Apertures 29, 29' in the railway support arms 18, 18' and apertures 30, 30' and 31, 31' in the pivoting support arms 13, 13' are replaced with apertures 53, 53' and 54, 54' in the railway wheel support arms and apertures 52, 52' in the pivoting support arms. Additionally, slots 12, 12' in the rigid support arms 11, 11' are made rectangular rather than arcuate to minimize manufacturing expense, with the width of the slot exceeding the diameter of pin 17. FIG. 6 more clearly shows the pivot pin 19 to be closer to the half-round bar 45, and therefore closer to the vehicle suspension, than to the vertical axis 16 extending through pivot pin 14.

Figure 8:
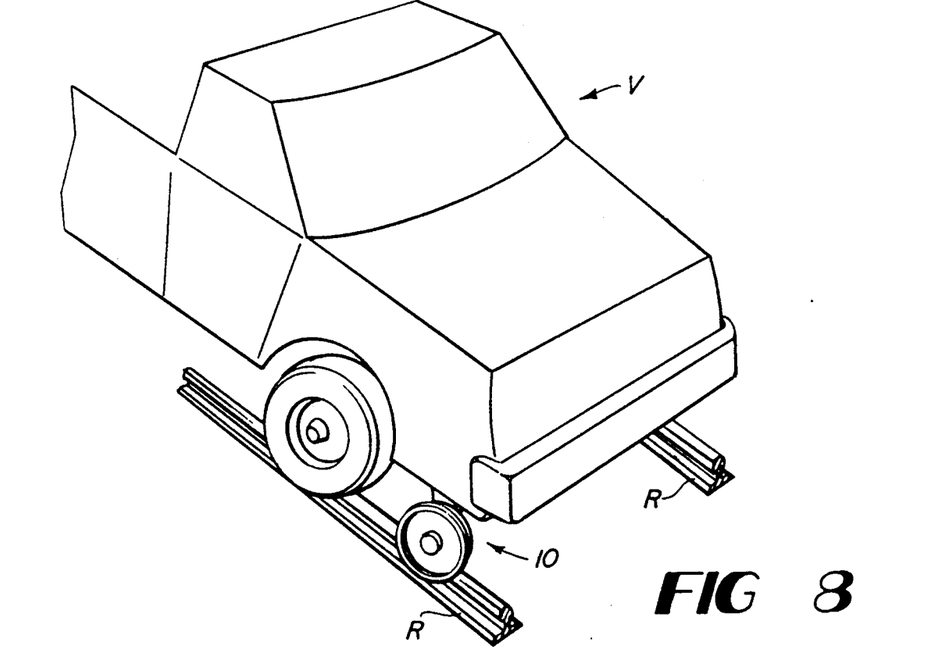
FIG. 8 is a perspective illustration of the conversion apparatus mounted to a vehicle for use on a railway.

FIG. 8 shows a vehicle V equipped with a conversion apparatus 10 at the front end of the vehicle for use on a pair of railway tracks R. Of course, to raise the rear end of the vehicle V above the railway tracks requires the use of an additional conversion apparatus 10 or some other type of conversion apparatus, and in most instances it is anticipated that some apparatus different the present invention is indicated.

OPERATION

The conversion apparatus 10 can be used as follows. With the conversion apparatus 10 mounted at the front end of the vehicle, and with the railway wheel support arms 18, 18' in the raised position, the vehicle is driven onto a railway track to a position in which the road wheels of the vehicle straddle the track and in which the railway wheels 21 are positioned directly over the railway tracks. An operator then removes the lock pins 27 from within the apertures 30 in each assembly 20, 20' to allow the railway wheel support arms 18, 18' to be moved to the lowered position. With the railway wheel support arms in the raised position, the pivoting support arms are suspended by the pins 17 and the tongues 37 are at a level that is below that of half-round bars 45. Upon the removal of both lock pins, hydraulic pressure is supplied, as by an unshown hydraulic pump with manual controls, to the hydraulic cylinders 22 to move the railway wheel support arms from the raised position shown in FIG. 2B to the lowered position of FIG. 2A.

As the railway wheel support arms 18 move downwardly, the linkages 42 extend the elongated tongues 37 under the vehicle suspension. As the tongues 37 slip beneath the half round bars, the beveled portion 39 of the elongated tongues work to help ease the tongues past the half round bars in the event that the tongues are not completely below the level of the half-round bars. As the railway wheel support arms 18, 18' are sWung completely down to the lowered position of FIG. 2A, the pivoting support arms 13, 13' are lifted engaging the tongues with the half-round bars. The front end of vehicle is thereby lifted by the conversion apparatus 10 acting through the elongated tongues 37 and the pivot pins 14. In other words, some of the weight of the vehicle is transferred through the vehicle suspension to the conversion apparatus 10 through the elongated tongues 37 and the pivot pins 14 to cushion the ride of the vehicle on the railway. Preferably, a majority of the weight of the vehicle borne by the conversion apparatus is transferred through the vehicle suspension owing to the placement of the railway wheel support arm closer to the vehicle suspension than to the pivot pin 14.

Figure 1A:
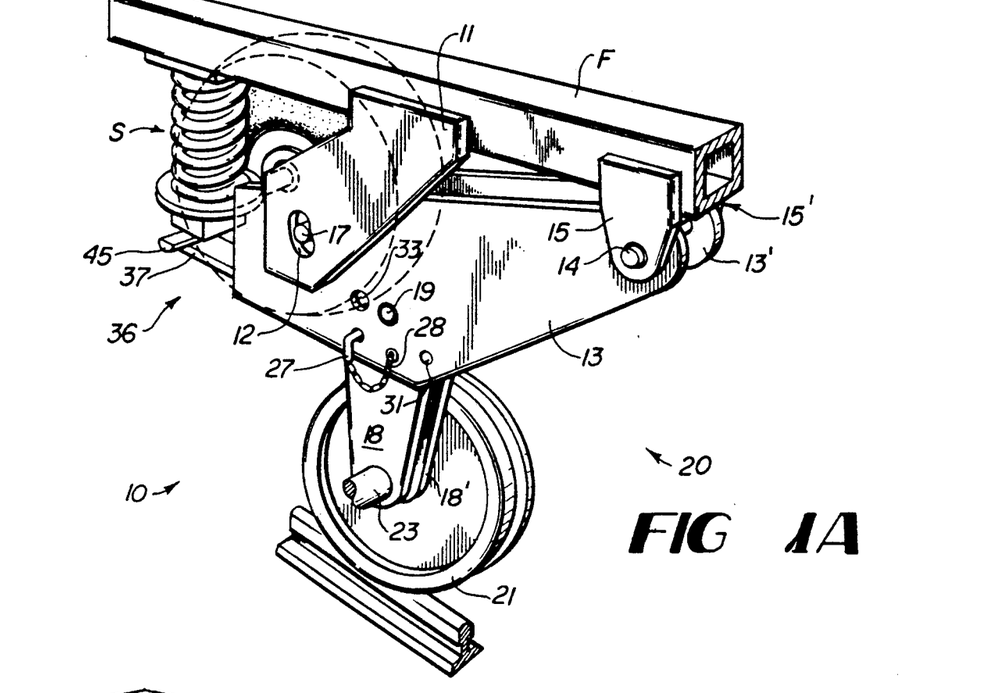
FIG. 1A is a perspective illustration of a conversion apparatus according to the present invention in a preferred form, shown attached to a portion of a vehicle frame.
Figure 1B:
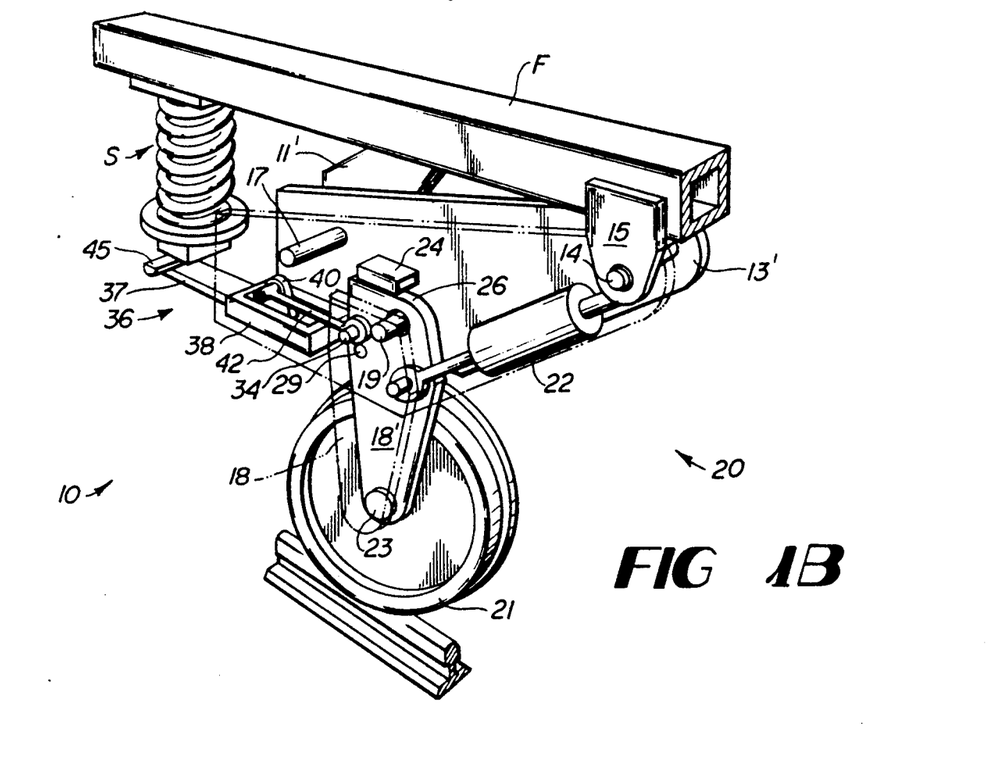
FIG. 1B is a perspective illustration of the conversion apparatus of FIG. 1A, with some elements removed for clarity of illustration.
Figure 2A:
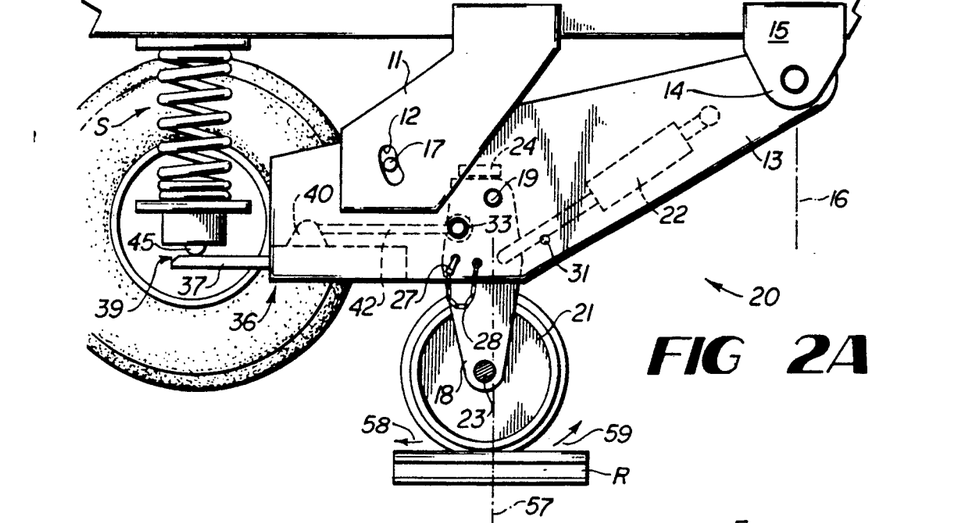
FIG. 2A is a side view of the conversion apparatus of FIG. 1A, with a railway wheel portion of the apparatus shown in a lowered position.
Figures 2B, 3:
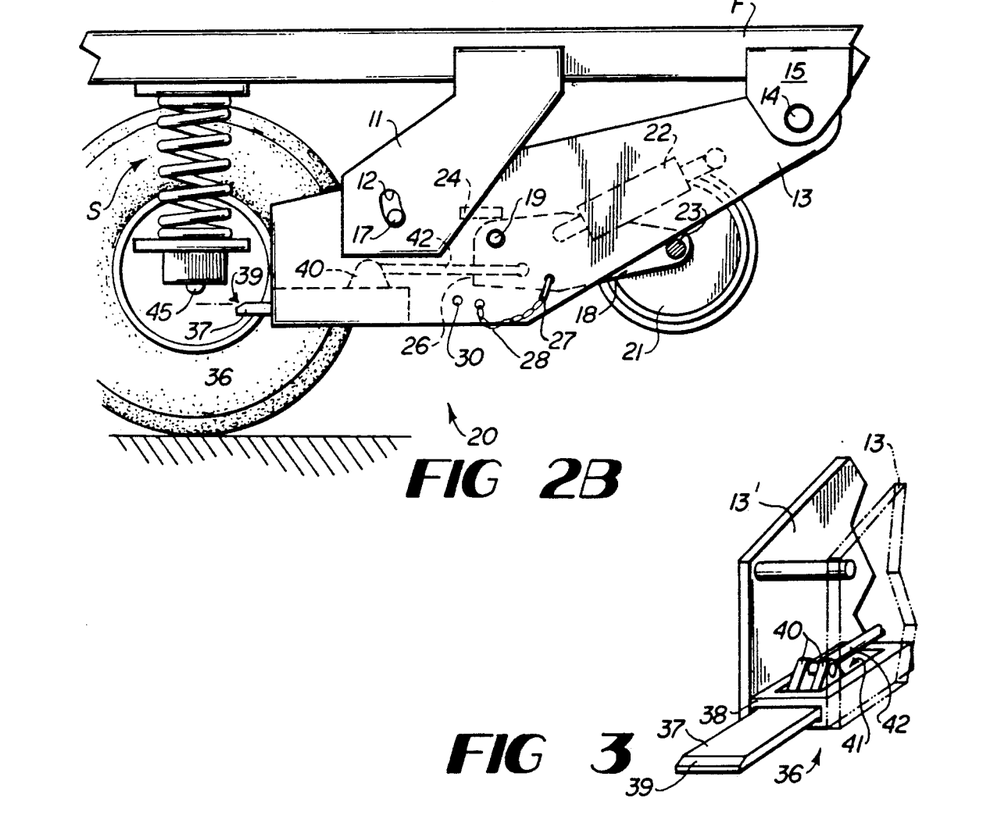
FIG. 2B is a side view of the conversion apparatus of FIG. 2A, with the railway wheel portion of the apparatus shown in a raised position.
FIG. 3 is a perspective illustration of a portion of the conversion apparatus of FIG. 1A.

Furthermore, as the railway wheel support arms move from the initial raised position of FIG. 2B to the lowered position of FIG. 2A, the elongated slots 12 and pins 17 move from the configuration of 2B in which the pins 17 are supported by a lower portion of the slots 12, the rigid support arms 11 thereby supporting the pivoting support arms 13, to a configuration in which the support pins 17 are "free floating" near the middle of the slot. This occurs as the weight is transferred from the road wheels to the railway wheels 21 and allows the apparatus to follow the suspension as it moves through some travel up and down to provide a cushioned ride. The length of the slots provide some absolute limits on the amount of travel of the support pins 17 and thereby limits the amount of travel and rotation of the pivoting support arms 13. The locks and pins also provide a safety support should the tongues fail to lift the vehicle suspension. In that event, the slots and pins support the vehicle sufficiently to allow emergency travel.

With the railway wheel support arms in the fully lowered position of FIG. 2A, the lock pins 27 are inserted into the aligned apertures 30 to securely lock the railway wheel support arms in the lowered position. The vehicle is then ready for travel on the railway.

As shown in FIGS. 2A and 6, with the railway wheel support arm in the lowered position, axle 23 is not aligned with a vertical axis 57 extending through pivot pin 19. With the railway wheel support arm in this "past center" position, the railway wheel support arm is stably and safely held in the lowered position as follows. The weight of the vehicle supported on the railway wheel support arm tends to urge the arm in the direction of arrow 58. Motion in this direction is limited by the stop 24 shown in FIG. 2A or by the stop 56 shown in FIG. 6. Forces tending to urge the railway wheel support arm in the direction of arrow 59 are opposed by the weight of the vehicle acting through the railway wheel support arm as well as by the hydraulic cylinder 22.

With the railway wheel support arms in the fully lowered position the vehicle suspension is supported by the tongues 37 contacting the half-round bars 45. The smooth round surface of the bars engages the smooth upper surface of the tongues 37 to allow the tongues to slide beneath the bars while supporting the vehicle suspension. This sliding contact is particularly important to allow the pivoting support arms and the vehicle suspension to go through differing paths of travel as the vehicle travels over a railway. Coupling the conversion apparatus to the suspension in this manner allows the suspension and the pivoting support arms to go through independent paths of travel and avoids placing undesirable lateral stresses on both the suspension and the conversion apparatus. To that end it may be possible to replace the half-round bars with one or more rollers similarly situated.

To convert the vehicle from railway use to road use, the reverse of the above process is naturally employed.

By coupling and decoupling the conversion apparatus with the vehicle suspension, the vehicle suspension is unencumbered by the conversion apparatus when the railway wheel support arm is raised, thereby avoiding any possible negative effect on the suspension performance when the vehicle is not being used on a railway.

While the invention has been described as suitable for converting road vehicles for travel on a railway, it will be readily apparent that principles of the invention are equally applicable in converting for railway travel vehicles not primarily considered road vehicles.

While the invention has been described in preferred forms, it will be obvious to one skilled in the art that many modifications, additions and deletions may be made thereto without departing from the spirit and scope of the invention as set forth in the following claims.

I claim:

1. An apparatus for converting a vehicle for travel on a railway, the vehicle having a frame and a suspension means for suspending road wheels from the frame, said apparatus comprising:
   a first support member rigidly mounted to the vehicle frame;
   a second support member pivotally mounted at a first portion to the vehicle frame and coupled to said first support member for limited pivotal movement of said second support member relative to the vehicle frame;
   a railway wheel support member pivotally mounted at a first portion thereof to said second support member for movement between raised and lowered positions;
   a railway wheel rotatably mounted to said railway wheel support member distal from said first portion of said railway wheel support member;
   means for moving said railway wheel support member between said raised and lowered positions and for securing said railway wheel support member in said raised and lowered positions; and
   means mounted to said second support member and movable into supporting engagement with the vehicle suspension means in response to said railway wheel support member being moved to its lowered position for temporarily supporting the suspension means of the vehicle and movable out of supporting engagement with the vehicle suspension means in response to said railway wheel support member being moved to its raised position.

2. An apparatus as claimed in claim 1 wherein said means for temporarily supporting the vehicle suspension means comprises a tongue member movable between a retracted position spaced from the vehicle suspension means and an extended position beneath and engaging the vehicle suspension means.

3. An apparatus as claimed in claim 2 further comprising linkage means for extending said tongue member as said railway wheel support member is moved to said lowered position and for retracting said tongue member as said railway wheel support member is moved to said raised position.

4. An apparatus as claimed in claim 1 wherein said second support member is coupled to said first support member by means of an elongated slot formed in one of said first and second support members and a support pin mounted to the other of said first and second support members and received within said elongated slot.

5. An apparatus as claimed in claim 2 further comprising a hydraulic cylinder for moving said tongue member between said extended and said retracted positions.

6. An apparatus as claimed in claim 2 wherein said tongue member has a generally flat upper surface and further comprising a rigid member having a partially arcuate outer surface and secured to a lower portion of the vehicle suspension means in a position to engage said tongue member upper surface with said partially arcuate outer surface with said tongue member in said extended position.

7. An apparatus as claimed in claim 1 wherein said means for temporarily supporting the vehicle suspension means comprises a tongue member which is positionable beneath the vehicle suspension means for slidably supporting the vehicle suspension means.

8. An apparatus as claimed in claim 7 further comprising a member secured to a lower portion of the vehicle suspension means having a partially arcuate outer surface for engaging the tongue member.

9. An apparatus as claimed in claim 1 wherein said means for temporarily supporting the vehicle suspension means comprises a rigid member mounted to the vehicle suspension and wherein said second support member pivotally mounted at said first portion to the vehicle frame pivots about a pivot axis, and wherein said railway wheel support member pivotally mounted at said first portion thereof to said second support member is so pivotally mounted at a point closer to said rigid member mounted to said vehicle suspension means than to a vertical axis extending through said pivot axis of said second support member, whereby with the railway wheel support member in the lowered position supporting the vehicle, most of the load supported by the railway wheel support member is supported through the vehicle suspension.

10. An apparatus for converting a vehicle for travel on a railway, the vehicle having a frame and a suspension, said apparatus comprising:
   a support arm pivotally mounted to the vehicle frame;
   means for limiting pivotal movement of said support arm relative to the vehicle frame;
   a railway wheel support arm pivotally mounted at one of its ends to said support arm for movement between raised and lowered positions with respect to said support arm;
   a railway wheel rotatably mounted to the other end of said railway wheel support arm;
   means for moving said railway wheel support arm between said raised and lowered positions so as to raise and lower the wheel with respect to the frame of the vehicle; and
   means for coupling said support arm with the vehicle suspension in response to said railway wheel support arm being moved to said lowered position in a manner to slidably support the vehicle suspension and for decoupling said second support member from the vehicle suspension in response to said railway wheel support arm being moved to said raised position.

11. An apparatus as claimed in claim 10 wherein said means for coupling and decoupling comprises a rigid member movable between a retracted position spaced from the vehicle suspension and an extended position beneath and supporting the vehicle suspension.

12. An apparatus as claimed in claim 11 further comprising linkage means for extending said movable member as said railway wheel support arm is moved to said lowered position and for retracting said movable member as said railway wheel support arm is moved to said raised position.

13. An apparatus as claimed in claim 10 wherein said means for coupling and decoupling comprises a movable member which is positionable beneath the vehicle suspension for slidably supporting the vehicle suspension.

14. An apparatus for converting a vehicle for travel on a railway, the vehicle having a frame and a suspension, said apparatus comprising:
   a support member pivotally mounted to the vehicle frame;
   means for limiting pivotal movement of said support member relative to the vehicle frame;
   a railway wheel support arm pivotally mounted to said support member for movement between raised and lowered positions;
   a railway wheel rotatably mounted to said railway wheel support arm;
   hydraulic means for moving said railway wheel support arm between said raised and lowered positions;
   and means for slidably coupling said support member with the vehicle suspension in a manner to allow the vehicle suspension and said support member to travel through different paths of movement.

15. Apparatus for converting a vehicle for travel on a railway, the vehicle including a frame and suspension means for supporting road wheels from the frame, said apparatus comprising:
   a support arm pivotally suspended form said frame,
   a railway wheel support arm pivotably mounted at one end portion to said support arm for movement between raised and lowered positions with respect to said support arm,
   a railway wheel rotatably mounted to the other end of said railway wheel support arm,
   means for moving said railway wheel support arm between raised and lowered positions so as to move the railway wheel with respect to the frame of the vehicle between raised and lowered positions; and
   means responsive to the movement of said railway wheel toward its lowered positions or movement to a position beneath the suspension means of the vehicle and for supporting the suspension means, and responsive to the movement of said railway wheel toward the raised position for movement away from the position beneath the suspension means of the vehicle.

16. An apparatus for converting a road vehicle for travel on a railway, the vehicle having a frame and a suspension means for suspending road wheels from the frame, said apparatus comprising:
   a pivoting support member pivotally mounted to the vehicle frame;
   a railway wheel support member mounted to said pivoting support member for movement between raised and lowered positions;
   a railway wheel rotatably mounted to said railway wheel support member adjacent one end portion of said railway wheel support member;
   means for moving said railway wheel support member between said raised and lowered positions and for securing said railway wheel support member in said raised and lowered positions; and
   means carried by said pivoting support member for movement into engagement with the vehicle suspension means and supporting the vehicle suspension means in response to said railway wheel support member being moved to its lowered position and for movement out of engagement with the vehicle suspension means in response to said railway wheel support member being moved to its raised position.

17. An apparatus as claimed in claim 16 further comprising means for limiting the pivotal movement of said pivoting support member relative to the vehicle frame.

18. An apparatus as claimed in claim 17 wherein said means for limiting the pivotal movement of said pivoting support member relative to the vehicle frame comprises a second support member rigidly mounted to the vehicle frame and movably coupled to said pivoting support member.

19. An apparatus as claimed in claim 16 and wherein said means for movement into engagement with the vehicle suspension means comprises a tongue member movable between a retracted position spaced from the vehicle suspension means and an extended position beneath and engaging the vehicle suspension means.

20. An apparatus for converting a vehicle for travel on a railway, the vehicle having a frame and a suspension means for suspending road wheels from the frame, said apparatus comprising:
   a railway wheel;
   support means pivotally mounted at a first portion thereof to the vehicle frame and movably supporting said railway wheel between raised and lowered positions, said railway wheel being rotatably mounted to said support means;

means for moving said railway wheel between its raised and lowered positions;

means for limiting pivotal movement of said support means relative to the vehicle frame; and a tongue member carried by said support means movable between a retracted position spaced from the suspension means and movable to an extended position beneath said suspension means in response to the movement of said railway wheel between its respective raised and lowered positions for supporting the suspension means when the railway wheel is in its lowered position.

21. An apparatus for converting a vehicle for travel on a railway, the vehicle having a frame and a suspension means suspending road wheels from the frame, said apparatus comprising:

a support arm pivotally supported at a first portion thereof to the vehicle frame;

a railway wheel rotatably supported by a second end portion of said support arm;

means for pivoting said support arm about its first end portion so as to raise the railway wheel away from the railway tracks beneath the vehicle and lower the railway wheel downwardly into engagement with the railway tracks beneath the vehicle; and means responsive to the downward pivoting movement of said railway wheel toward the railway tracks for slidably engaging and supporting the suspension means and lifting the road wheels to a position raised above the railway tracks and responsive to the upward pivoting movement of said railway wheel away from the railroad tracks for disengaging from the suspension means and permitting the road wheels to be lowered.

22. An apparatus as claimed in claim 21 wherein said means for engaging the suspension means comprises a tongue member movable between a retracted position spaced from the suspension means and an extended position beneath the suspension means.

23. An apparatus as claimed in claim 22 further comprising means for moving said tongue member between its retracted and extended positions.

24. An apparatus as claimed in claim 22 further comprising means for limiting the pivotal movement of said support arm relative to the vehicle frame.

25. An apparatus as claimed in claim 24 wherein said means for limiting the pivotal movement of said support arm comprises a rigid member mounted to the vehicle frame and pivotally attached to said support arm.

* * * * *